United States Patent
Yeo et al.

(10) Patent No.: US 7,793,006 B2
(45) Date of Patent: Sep. 7, 2010

(54) METHOD AND APPARATUS FOR MANAGING RECONFIGURATION DATA MEMORY WITH A PRESERVATION DATA STORING BUFFER IN THE TARGET SYSTEM AND SERVER

(75) Inventors: Soon Il Yeo, Daejeon (KR); Myung Shin Kwak, Daejeon (KR); Jong Dae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 584 days.

(21) Appl. No.: 10/917,727

(22) Filed: Aug. 13, 2004

(65) Prior Publication Data

US 2005/0125568 A1 Jun. 9, 2005

(30) Foreign Application Priority Data

Dec. 5, 2003 (KR) .................. 10-2003-0087991

(51) Int. Cl.
| G06F 3/00 | (2006.01) |
| G06F 5/00 | (2006.01) |
| G06F 13/00 | (2006.01) |
| G06F 12/00 | (2006.01) |
| G06F 9/00 | (2006.01) |
| G06F 9/44 | (2006.01) |

(52) U.S. Cl. .................. 710/8; 710/13; 710/16; 710/52; 710/104; 710/200; 711/113; 711/162; 713/2; 717/172

(58) Field of Classification Search .............. 710/8, 710/13; 709/202, 216, 221
See application file for complete search history.

(56) References Cited

U.S. PATENT DOCUMENTS

| 5,623,604 A * | 4/1997 | Russell et al. .......... 717/167 |
| 5,784,622 A * | 7/1998 | Kalwitz et al. .......... 710/200 |
| 5,794,246 A * | 8/1998 | Sankaran et al. ........ 707/101 |
| 6,434,682 B1 * | 8/2002 | Ashton et al. .......... 711/162 |

(Continued)

FOREIGN PATENT DOCUMENTS

KR 1020020011870 A 2/2002

(Continued)

OTHER PUBLICATIONS

Jing et al., "Client-Server Computing in Mobile Environments", ACM, pp. 117-157, Jun. 1999.*

(Continued)

*Primary Examiner*—Tariq R. Hafiz
*Assistant Examiner*—Henry Yu
(74) *Attorney, Agent, or Firm*—Blakely, Sokoloff, Taylor & Zafman LLP

(57) ABSTRACT

Provided are an apparatus and a method of managing a reconfiguration data memory. A space for a memory that stores configuration data used for reconfiguration of a target system is not provided in the target system. Instead the configuration data is stored in a separate server and, if required, the configuration data is transmitted to the target system through an Internet. Data that should be preserved after the reconfiguration among data contents stored in SoC internal and external memories of the target system is transferred to the server. The emptied space of the SoC internal and external memories is used as a configuration memory. After the reconfiguration, the preservation data is returned to its original position in the memories.

12 Claims, 4 Drawing Sheets

U.S. PATENT DOCUMENTS

| | | | |
|---|---|---|---|
| 6,542,844 B1* | 4/2003 | Hanna | 702/120 |
| 6,640,280 B1* | 10/2003 | Kamvysselis et al. | 711/113 |
| 6,678,646 B1* | 1/2004 | McConnell et al. | 703/22 |
| 6,687,801 B1* | 2/2004 | Kamvysselis | 711/162 |
| 6,901,493 B1* | 5/2005 | Maffezzoni | 711/162 |
| 7,003,767 B2* | 2/2006 | Larkin | 717/172 |
| 7,197,541 B1* | 3/2007 | Skinner et al. | 709/216 |
| 2001/0048689 A1* | 12/2001 | Bennett et al. | 370/412 |
| 2002/0026436 A1* | 2/2002 | Joory | 707/1 |
| 2003/0061409 A1* | 3/2003 | RuDusky | 710/8 |
| 2003/0217254 A1* | 11/2003 | Page et al. | 713/2 |
| 2004/0073902 A1* | 4/2004 | Kao et al. | 717/171 |
| 2004/0187012 A1* | 9/2004 | Kohiyama et al. | 713/193 |

FOREIGN PATENT DOCUMENTS

KR    2003-0016210    2/2003

OTHER PUBLICATIONS

Hauswirth et al., "A Component and Communication Model for Push Systems", ACM, pp. 20-38, Oct. 1999.*
Real-Time Linux, pp. 189-199.
"A Reconfigurable Memory Allocation Model for Real-Time Linux System." *Real-Time Linux*. Sep. 2001. pp. 189-199.

* cited by examiner

METHOD AND APPARATUS FOR MANAGING RECONFIGURATION DATA MEMORY WITH A PRESERVATION DATA STORING BUFFER IN THE TARGET SYSTEM AND SERVER

BACKGROUND OF THE INVENTION

This application claims the priority of Korean Patent Application No. 2003-87991, filed on Dec. 5, 2003, in the Korean Intellectual Property Office, the disclosure of which is incorporated herein in its entirety by reference.

1. Field of the Invention

The present invention relates to a system on a chip (SoC) and, more particularly to an apparatus and a method of managing a reconfiguration data memory when a reconfigurable SoC is constructed.

2. Description of the Related Art

Recently, a demand for a system on a chip (SoC), especially, a reconfigurable SoC, has increased. The reconfigurable SoC includes an internal processor that takes charge of processing and control and utilizes a memory in various ways so as to realize a target system. Since there is a limit in the inner space of the SoC for the memory, a large-capacity memory is arranged outside the SoC to construct the target system. Internal and external memories of the SoC are indispensable to the target system based on the SoC. As the internal and external memories of the SoC, DRAMs, SRAMs, flash memories, EEPROMs and so are used. Furthermore, these memories are used for embedded software that is indispensable to the SoC.

FIG. 1 is a block diagram of a conventional reconfigurable SoC. Referring to FIG. 1, the reconfigurable SoC includes a micro process unit (MPU)/digital signal processor (DSP) 10, a reconfiguration logic 20, an application specific integrated circuit (ASIC) 30, and a data memory 40, which are organically connected.

The MPU/DSP 10 takes charge of processing and control of the SoC and accesses corresponding instructions of an instruction memory 15 and data of the data memory 40 if required. The reconfiguration logic 20 includes a common circuit 21 with respect to a part that can be commonly used for reconfigurable functions and a reconfiguration data processor 22 that connects the MPU/DSP 10 to the ASIC 30. The reconfiguration data processor 22 receives configuration data required for reconfiguration from a configuration data memory 25 and processes it to achieve the reconfigurable SoC. The ASIC 30 selects a specific one of various ASICs having functions the SoC requires.

As described above, to construct the reconfigurable SoC needs a physical space for the configuration data memory 25 required for reconfiguration. In a prior art, separate memories used only for reconfiguration are arranged inside and outside the SoC in order to manage a reconfiguration data memory, and the configuration data is stored in the separate memories. Especially, when the SoC employs a lot of internal processors in array form, lots of configuration data memories are needed. This increases the space occupied by the memories.

SUMMARY OF THE INVENTION

The present invention provides an apparatus of managing a reconfiguration data memory, which minimizes a reconfiguration memory space and optimizes utilization of internal and external memories of an SoC.

The present invention also provides a method of managing a reconfiguration data memory, which minimizes a reconfiguration memory space and optimizes utilization of internal and external memories of an SoC.

According to an aspect of the present invention, there is provided an apparatus of managing a reconfiguration data memory comprising a server and a target system connected to the server through a wired/wireless Internet. The server includes a configuration data storage unit, a temporary storage unit, and a target system connection unit. The target system includes an SoC having an internal memory, and an external memory. The server stores configuration data required for reconfiguration of the target system in the configuration data storage unit, and transfers the configuration data to the target system through the target system connection unit at the request of the target system. In addition, the server calls preservation data stored in the internal and external memories of the target system, which should be preserved even after the completion of reconfiguration, to store the preservation data in the temporary storage unit. The server returns the preservation data to its original position when the reconfiguration of the target system is finished.

According to another aspect of the present invention, there is provided a method of managing a reconfiguration data memory, in which a space for a configuration data memory is not provided in a target system, and configuration data is stored in a separate external server. When the target system requires the configuration data for the purpose of reconfiguration of an SoC, required specific data is stored in SoC internal and external memories provided in the target system through a wired/wireless Internet and then the reconfiguration is carried out.

The method of managing a reconfiguration data memory comprises preparing a server including a reconfiguration data storage unit for storing configuration data; a target system generating a request for reconfiguration and delivering it to the server; and transferring preservation data stored in SoC internal and external memories of the target system to the server and temporarily storing it in the server. The method further comprises transferring the configuration data to the SoC internal and external memories; carrying out reconfiguration of an SoC of the target system; informing the server of the completion of reconfiguration; and returning the preservation data temporarily stored in the server to the SoC internal and external memories.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
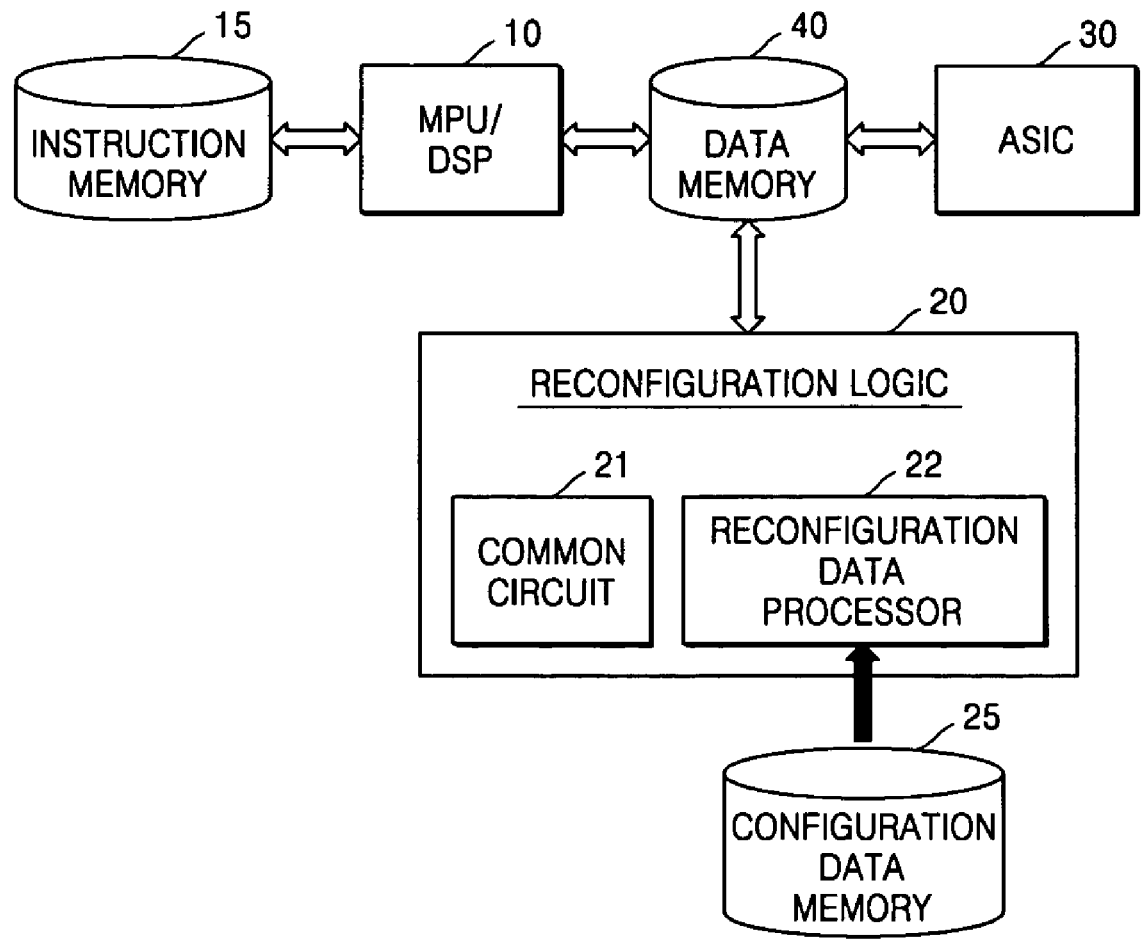
FIG. 1 is a block diagram of a conventional reconfigurable SoC.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals refer to like elements.

The present invention does not require a memory for storing configuration data in a target system. Instead the invention stores the configuration data in a separate server and reads it from the server if required. The server is connected to the target system through a wired/wireless Internet. A real time operating system (RTOS) for the Internet connection is included in an SoC of the target system. By doing so, the present invention omits a configuration memory space in the target memory. Accordingly, when an SoC having a large-capacity processor in array form is reconfigured, the entire system size can be reduced and the utilization of a memory provided in the target system can be maximized. It is expected that a memory for future SoCs using multiple MPUs or DSPs have very large capacity. Thus, it is desirable to omit the space occupied by this memory in the target system.

Figure 2:
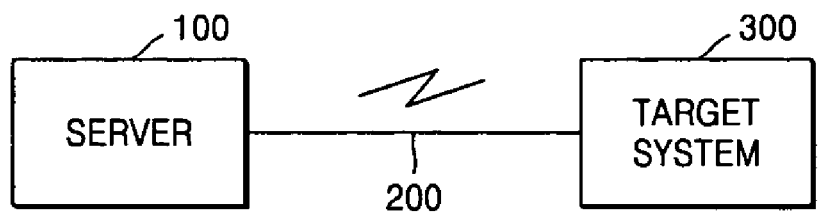
FIG. 2 is a schematic diagram of an apparatus of managing a reconfiguration data memory according to the present invention.

FIG. 2 is a schematic diagram of an apparatus of managing a reconfiguration data memory according to the present invention. Referring to FIG. 2, the apparatus includes a server 100 and a target system 300. The server 100 and target system 300 are connected to each other through a wired/wireless Internet 200.

Figure 3:
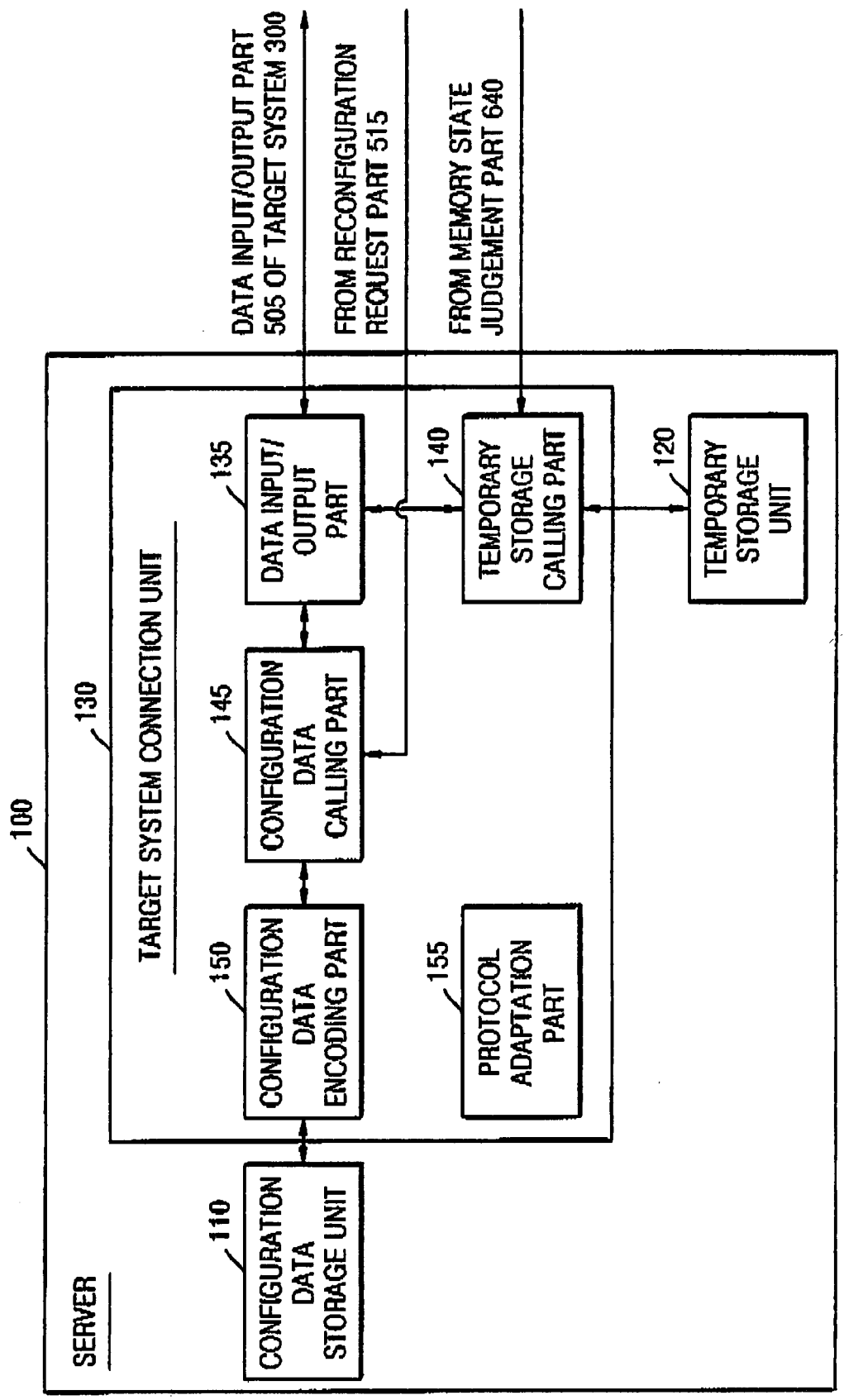
FIG. 3 is a block diagram of the server of FIG. 2.

FIG. 3 is a block diagram of the server 100. Referring to FIG. 3, the server 100 includes a configuration data storage unit 110, a temporary storage unit 120, and a target system connection unit 130.

The server 100 stores configuration data required for reconfiguration of the target system in the configuration data storage unit 110 and sends the configuration data to the target system (300 of FIG. 2) at the request of the target system. In addition, the server 100 temporarily stores data contents, which are stored in SoC internal and external memories of the target system 300, in the temporary storage unit 120 and returns the data contents to the SoC internal and external memories when the reconfiguration of the target system 300 is finished.

The target system connection unit 130 processes input/output of data transmitted between the server 100 and the target system 300 through a data input/output part 135. Data input to the server 100, which will be used even after the reconfiguration of the target system 300 (referred to as preservation data in FIG. 4), is stored in the temporary storage unit 120 via the data input/output part 135. When the reconfiguration of the target system 300 is completed, the data stored in the temporary storage unit 120 is returned to the memory of the target system 300 at the request of a temporary storage calling part 140. A memory state judgement part 640 (shown in FIG. 4) of the target system 300 informs the temporary storage calling part 140 of the completion of the reconfiguration of the target system such that the temporary storage calling part 140 requests the data stored in the temporary storage unit 120 to be returned to the memory of the target system 300. The target system connection unit 130 further includes a configuration data calling part 145, a configuration data encoding part 150, and a protocol adaptation part 155, which will be described later.

Figure 4:
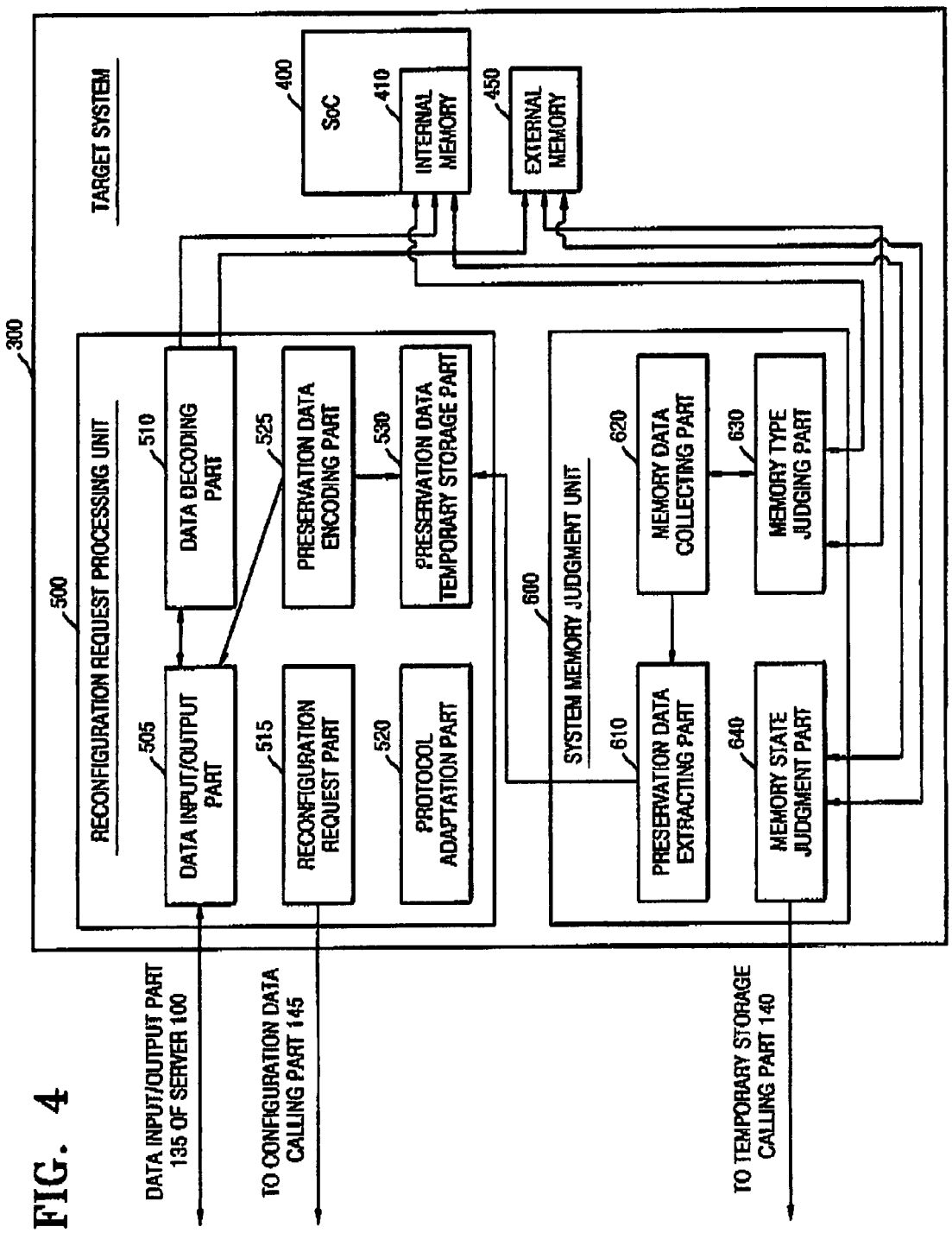
FIG. 4 is a block diagram of the target system of FIG. 2.

FIG. 4 is a block diagram of the target system 300. Referring to FIG. 4, the target system 300 includes an SoC 400 having an internal memory 410, an external memory 450, a reconfiguration request processing unit 500, and a system memory judgement unit 600.

The reconfiguration request processing unit 500 includes a data input/output part 505, a data decoding part 510, a reconfiguration request part 515, a protocol adaptation part 520, a preservation data encoding part 525, and a preservation data temporary storage part 530. The system memory judgement unit 600 includes a preservation data extracting part 610, a memory data collecting part 620, a memory type judging part 630, and the memory state judgement part 640.

The apparatus and method of managing a reconfiguration data memory according to the present invention are explained in detail with reference to FIGS. 3 and 4.

A procedure of transferring the configuration data stored in the server 100 to the SoC internal memory 410 and external memory 450 is explained first. When the reconfiguration request part 515 of the reconfiguration request processing unit 500 receives a request for reconfiguration from a user of the target system 300, the reconfiguration request part 515 sends the request to the configuration data calling part 145 of the server 100 to call the data stored in the configuration data storage unit 110. The called data is transmitted to the target system 300.

Specifically, the configuration data calling part 145 is operated in connection with predetermined specific data regions in the configuration data storage unit 110 and processes the request for reconfiguration received from the reconfiguration request part 515. Here, to secure the configuration data transmitted from the server 100 to the target system 300, the configuration data encoding part 150 encodes the configuration data and sends it to the target system 300 via the configuration data calling part 145 and data input/output part 135. The target system 300 receives the encoded configuration data, decodes it through the data decoding part 510, stores the decoded data in the SoC internal and external memories 410 and 450, and then carries out reconfiguration.

The protocol adaptation part 155 in the server 100 adapts an Internet protocol of the server 100 to an Internet protocol of the target system 300 when the server 100 and target system 300 are connected to each other through the wired/wireless Internet 200. The protocol adaptation part 155 in the server 100 corresponds to the protocol adaptation part 520 of the reconfiguration request processing unit 500 in the target system 300. It is preferable that the protocol adaptation part 520 in the target system 300 is constructed as a hardware circuit in the SoC 400. The protocol adaptation part constructed as a hardware circuit has an advantage that it can be connected with various Internet servers in addition to the server 100. The protocol adaptation part 155 of the server 100 can be constructed as software currently used.

Now, a procedure of using the data used before the reconfiguration, that is, the data stored in the SoC internal and external memories 410 and 450 after the completion of the reconfiguration is described. This procedure is for the purpose of smoothly reconfiguring the target system 300 when there is a large quantity of configuration data for the reconfiguration. Specifically, the procedure erases the data stored in the SoC internal and external memories 410 and 450 and then newly stores the configuration data in the memories. Thus, the present invention can omit an independent memory space for storing only the configuration data, which should be provided inside and outside the SoC in the prior art.

The procedure is explained in more detail. The preservation data extracting part 610 extracts the preservation data that will be used even after the reconfiguration, and the preservation data temporary storage part 530 temporarily stores the extracted preservation data. The preservation data encoding part 525 encodes the preservation data in order to secure the preservation data while the data is transmitted to the server 100. The encoded data is sent to the server 100 via the data input/output part 505 of the target system 300 and stored in the temporary storage unit 120. Here, the data is stored in the encoded form. The memory state judgement part 640 detects the last data of the configuration data and, when it judges that the reconfiguration is completed, calls the temporary storage calling part 140.

The memory type judging part 630 judges the kinds of the SoC internal and external memories 410 and 450 to find out whether the internal and external memories include an EEPROM or flash memory. This procedure is needed because data stored in the internal and external memories will be used even after the reconfiguration, that is, the contents of the data should be stored in the temporary storage unit 120. In the meantime, the data includes RTOS, firmware, embedded software which are required for the operation of the target system 300 so that it is not used for the reconfiguration. Thus, even the space occupied by the data is used for storing the configuration data in the event of reconfiguration, to thereby secure the maximum configuration data memory space.

When the memory type judging part 630 judges that the internal and external memories include an EEPROM or flash memory, the memory data collecting part 620 collects data stored in the EEPROM or flash memory. Here, the SoC internal and external memories 410 and 450 other than the EEPROM or flash memory are reset before the memory data collecting part 620 collects the data stored in the EEPROM or flash memory. Thus, the reset SoC internal and external memories 410 and 450 can be used as a space for collecting the preservation data or the preservation data temporary storage part 530. The preservation data extracting part 610 extracts the data collected by the memory data collecting part 620 in a form capable of being transmitted to the server 100. That is, when there is a memory format different from a format the server requires, the memory format is adapted to the format of the server. The extracted data is transmitted to the server 100 through the data input/output part 505 of the target system 300.

Figure 5:
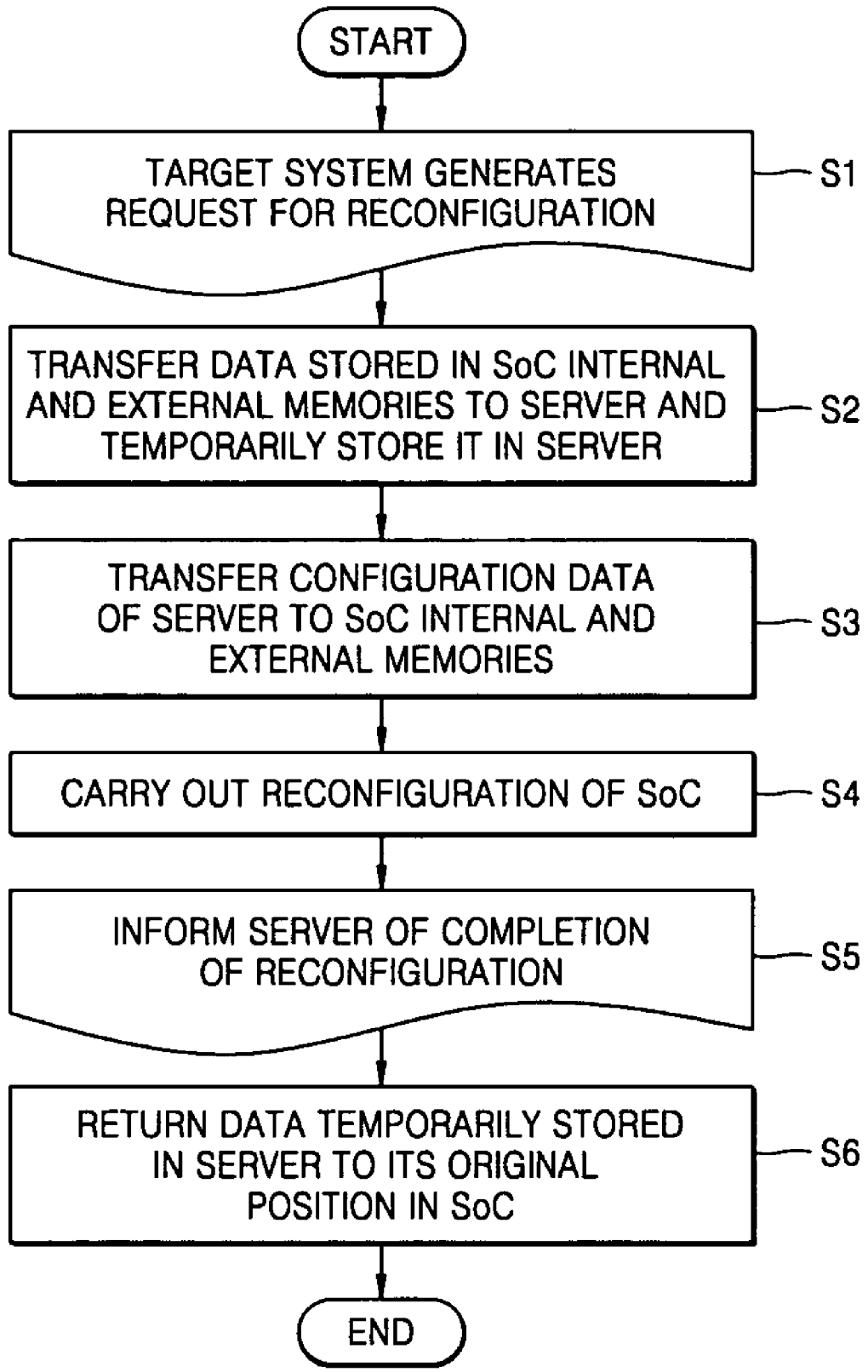
FIG. 5 is a flow chart of a method of managing a reconfiguration data memory according to the present invention.

FIG. 5 is a flow chart of the method of managing a reconfiguration data memory according to the present invention.

Referring to FIG. 5, the target system 300 generates a request for reconfiguration and delivers the request to the server 100 in step S1. In step S2, data stored in the SoC internal and external memories of the target system 300 is transferred to the server 100 and temporarily stored therein. In step S3, configuration data used for the reconfiguration is transferred to the SoC internal and external memories 410 and 450. In step S4, reconfiguration of SoC is carried out. In step S5, the target system 300 informs the server 100 of the completion of the reconfiguration. In step S6, the data temporarily stored in the server is returned to the SoC internal and external memories 410 and 450.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus of managing a reconfiguration data memory, comprising:
    a server including a configuration data storage unit, a temporary storage unit, and a target system connection unit; and
    a target system that is connected to the server through a wired/wireless Internet, the target system including a system on chip having an internal memory and an external memory, the target system further including a preservation data temporary storage part that temporarily stores preservation data in the internal and external memories before the preservation data is sent to the temporary storage unit, the target system further includes a reconfiguration request processing part which includes a preservation data encoding part that encodes the preservation data such that it is secure and then sends the encoded preservation data to the temporary storage unit, wherein the target system further includes a system memory judgment unit which comprises a memory type judging part that determines which of the internal and external memories stores the preservation data by detecting which of the internal or external memories is either a flash memory or an Electrically Erasable Programmable Read-Only Memory (EEPROM) and designating the flash memories and the EEPROMs as containing the preservation data; and
    wherein the server stores configuration data required for reconfiguration of the target system in the configuration data storage unit,
    the server transfers the configuration data to the target system through the target system connection unit at the request of the target system, the server calls preservation data stored in the internal and external memories of the target system to store the preservation data in the temporary storage unit, the preservation data being data required for operation of the target system before and after the reconfiguration, the temporary storage unit separate from the target system,
    the server performs the reconfiguration of the target system by executing the configuration data stored in the internal and external memories of the target system, and
    the server returns the preservation data from the temporary storage unit to its original position in the target system in response to notification from the target system that the reconfiguration of the target system is finished, wherein the target system connection unit comprises:
    a temporary storage calling part that returns the preservation data stored in the temporary storage unit to the target system when the reconfiguration of the target system is completed; and
    a memory state judgment part that detects the last piece of data of the configuration data being received and executed and, when it judges based on this detection that the reconfiguration is completed, calls the temporary storage calling part.

2. The apparatus as claimed in claim 1, wherein the target system connection unit comprises:
    a data input/output part that processes input and output of data transmitted between the server and target system; a configuration data calling part that calls configuration data that the target system requires;
    a configuration data encoding part that encodes the configuration data before the configuration data is transferred to the target system; and
    a protocol adaptation part that adapts Internet protocols of the server and target system to each other when the server is connected to the target system.

3. The apparatus as claimed in claim 2, wherein the reconfiguration request processing part further includes:
    a data input/output part that processes input and output of data transmitted between the target system and server;
    a reconfiguration request part that requests the configuration data calling part to call required configuration data;
    a data decoding part that decodes the configuration data encoded by the configuration data encoding part; and a protocol adaptation part that corresponds to the protocol adaptation part of the server.

4. The apparatus as claimed in claim 3, wherein the protocol adaptation part of the target system is constructed as a hardware circuit in the system on chip.

5. The apparatus as claimed in claim 2, wherein the protocol adaptation part of the server is constructed as software in the server.

6. The apparatus as claimed in claim 3, wherein the system memory judgment unit further comprises:
    a memory data collecting part that collects the preservation data from the one of the internal and external memories storing the preservation data; and
    a preservation data extracting part that extracts preservation data that will be temporarily stored in the preservation data temporary storage part.

7. The apparatus as claimed in claim 3, wherein the data decoding part decodes the preservation data that has been encoded and stored in the temporary storage unit, and then returns the decoded data to its original position in the internal and external memories.

8. A method of managing a reconfiguration data memory,
    wherein a space for a configuration data memory is not provided in a target system,
    configuration data is stored in a separate external server from the target system and, when the target system requires the configuration data for the purpose of reconfiguration of an system on chip,
    the target system temporarily storing required specific data in a preservation data temporary storage part before the required specific data is sent to a temporary storage unit that is separate from the target system, the required specific data being previously stored sequentially in system on chip internal and external memories provided in the target system, wherein the preservation data is encoded in the target system prior to being transferred to the temporary storage unit such that the preservation data is secure and the preservation data is stored in the encoded form in the temporary storage unit, wherein the target system determines which of the internal and external memories stores the preservation data by detecting which of the internal or external memories is either a flash memory or an Electrically Erasable Programmable Read-Only Memory (EEPROM) and designates the flash memories and the EEPROMs as containing the preservation data,
    the required specific data being transferred through a wired/wireless Internet and then the reconfiguration is carried out by executing the specific data stored in the internal and external memories of the target system, and
    preservation data is returned in encoded form to the target system from a temporary storage that is separate from the target system in response to notification from the target system that the reconfiguration of the target system is finished, the preservation data is decoded in the target system, and then stored in its original position, wherein the preservation data being data required for operation of the target system before and after the reconfiguration, wherein the target system determines that reconfiguration is finished based on the target system detecting the last piece of specific data being received and executed.

9. The method as claimed in claim 8, wherein the preservation data, which is to be preserved after the completion of reconfiguration, among data contents stored in the system on chip internal and external memories is temporarily stored in the server and, when the reconfiguration of the target system is finished, the preservation data is returned to its original position.

10. The method as claimed in claim 9, wherein a hardware protocol adaptation part is provided in the system on chip and a software protocol adaptation part is provided in the server in order to adapt protocols of the server and target system to each other when the configuration data and preservation data are transmitted between the server and target system through the wired/wireless Internet.

11. The method as claimed in claim 9, wherein the configuration data is encoded in the server, transferred to the target system, decoded and used in the target system.

12. A method of managing a reconfiguration data memory, comprising:
    preparing a server including a reconfiguration data storage unit for storing configuration data;
    generating a request for reconfiguration in a target system and delivering it to the server; storing temporarily, in a preservation data temporary storage part of the target system, preservation data from system on chip internal and external memories of the target system before the preservation data is sent to the server, wherein the preservation data is encoded prior to being sent to the server such that it is secure, wherein the target system determines which of the internal and external memories stores the preservation data by detecting which of the internal or external memories is either a flash memory or an Electrically Erasable Programmable Read-Only Memory (EEPROM) and designates the flash memories and the EEPROMs as containing the preservation data;
    transferring the preservation data to the server and temporarily storing it in the server, the preservation data being data required for operation of the target system before and after the reconfiguration, the server separate from the target system;
    transferring the configuration data to the system on chip internal and external memories of the target system;
    carrying out reconfiguration of an system on chip of the target system by executing the configuration data stored in the internal and external memories;
    informing the server of the completion of reconfiguration, wherein the target system determines that reconfiguration is finished based on the target system detecting the last piece of configuration data being received and executed; and
    returning the preservation data temporarily stored in the server separate from the target system to the system on chip internal and external memories of the target system in response to being informed of the completed reconfiguration, wherein the preservation data is decoded by the system on chip upon receipt.

* * * * *